(12) United States Patent
Kumar et al.

(10) Patent No.: US 7,680,117 B1
(45) Date of Patent: Mar. 16, 2010

(54) FORWARDING PACKETS USING NEXT-HOP INFORMATION

(75) Inventors: Nitin Kumar, Fremont, CA (US); Fritz Budiyanto, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 321 days.

(21) Appl. No.: 11/694,738

(22) Filed: Mar. 30, 2007

(51) Int. Cl.
 *H04L 12/28* (2006.01)
 *H04L 12/56* (2006.01)
(52) U.S. Cl. ..................................... 370/392
(58) Field of Classification Search ............... 370/401, 370/395.1, 389, 392

See application file for complete search history.

(56) References Cited

U.S. PATENT DOCUMENTS

| 5,905,725 | A | * | 5/1999 | Sindhu et al. ............... 370/389 |
| 6,370,144 | B1 | * | 4/2002 | Chao et al. ............. 370/395.42 |
| 6,493,347 | B2 | * | 12/2002 | Sindhu et al. ............... 370/401 |

* cited by examiner

*Primary Examiner*—Dang T Ton
*Assistant Examiner*—Frederick Ott
(74) *Attorney, Agent, or Firm*—Harrity & Harrity, LLP

(57) ABSTRACT

A method may include receiving a packet associated with a flow of packets, the packet including a destination address; selecting one of a plurality of memory banks, the selected memory bank being associated with the flow of packets, wherein each of the plurality of memory banks stores the same next-hop information for forwarding the packet to the destination address; accessing, in the selected memory bank, the next-hop information for forwarding the packet to the destination address; and forwarding the packet to the destination address based on the next-hop information.

17 Claims, 7 Drawing Sheets

ROUTING TABLE 364

| DEST. ADDR. 402 | NEXT-HOP INFO. MEMORY ADDRESS 404 | MEMORY BANK ALGORITHM 406 |
|---|---|---|
| 2.3.4.102 | 1234 | F(N) |
| 2.3.4.104 | 1235 | F(N) |
| 2.3.4.106 | 1236 | F(N) |
| 2.3.4.108 | 1237 | F(N) |
| ● ● ● | ● ● ● | ● ● ● |

FIG. 4

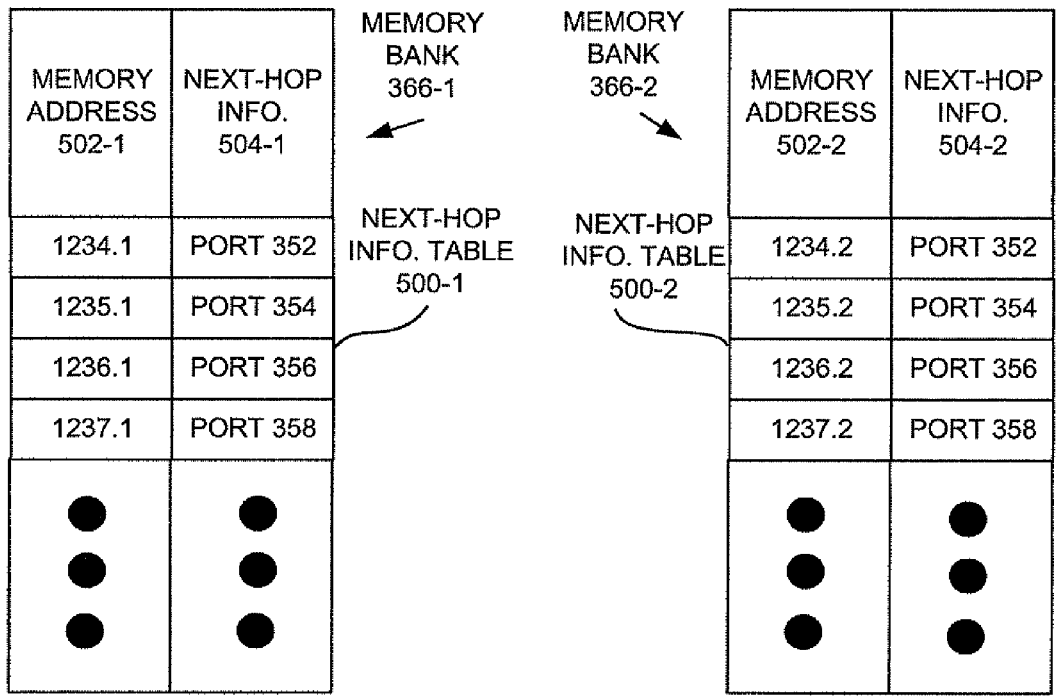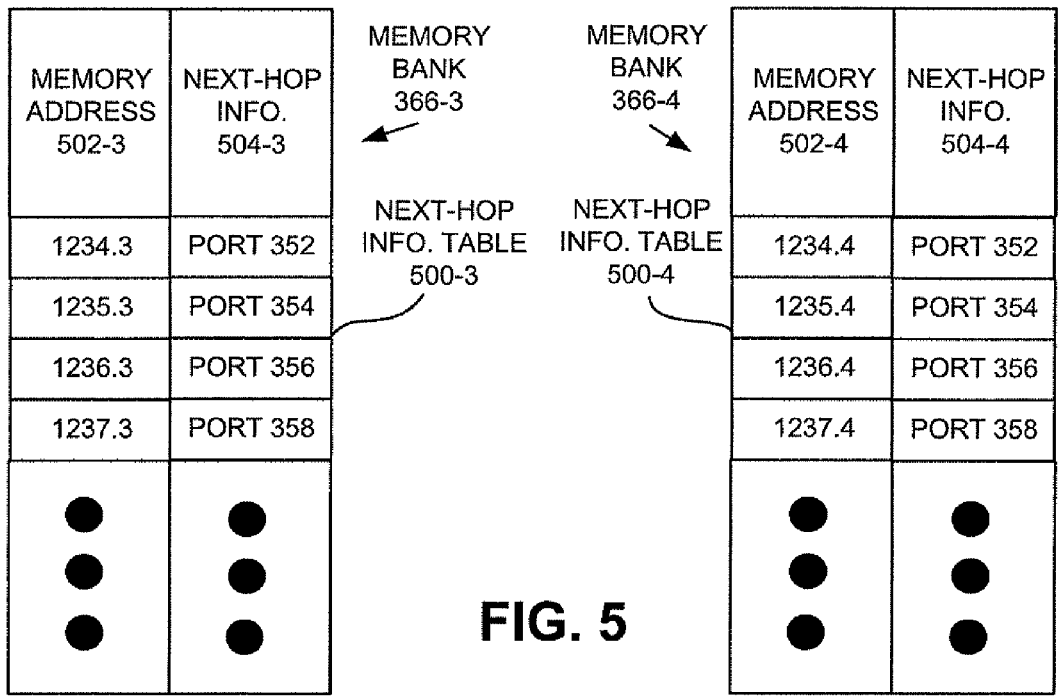
FIG. 5

स७,६८०,११७ B१

FORWARDING PACKETS USING NEXT-HOP INFORMATION

BACKGROUND

Networks may use routers, switches, and other network devices for receiving and forwarding packets. Such a network device may receive a packet through a port and may determine which port to forward the packet. The network device may access a routing table to determine on which port it should forward a packet that it received.

SUMMARY

According to one aspect, a method may include receiving a packet associated with a flow of packets, the packet including a destination address; selecting one of a plurality of memory banks, the selected memory bank being associated with the flow of packets, wherein each of the plurality of memory banks stores the same next-hop information for forwarding the packet to the destination address; accessing, in the selected memory bank, the next-hop information for forwarding the packet to the destination address; and forwarding the packet to the destination address based on the next-hop information.

According to another aspect, a device may include a receiving port to receive a packet including a destination address; a plurality of memory banks, wherein each of the plurality of memory banks includes the same information about a forwarding port for forwarding the packet to the destination address; processing logic to select one of the plurality of memory banks, the selected memory bank being associated with a flow of the packet, and access, in the selected memory bank, the information about the forwarding port.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

FIG. 4 is an exemplary routing table;

FIG. 5 is an exemplary next-hop information table in a memory bank;

DETAILED DESCRIPTION

The following detailed description refers to the accompanying drawings. The same reference numbers in different drawings may identify the same or similar elements. Also, the following detailed description does not limit the invention. Instead, the scope of the invention is defined by the appended claims and equivalents.

Exemplary Environment

Figure 1:
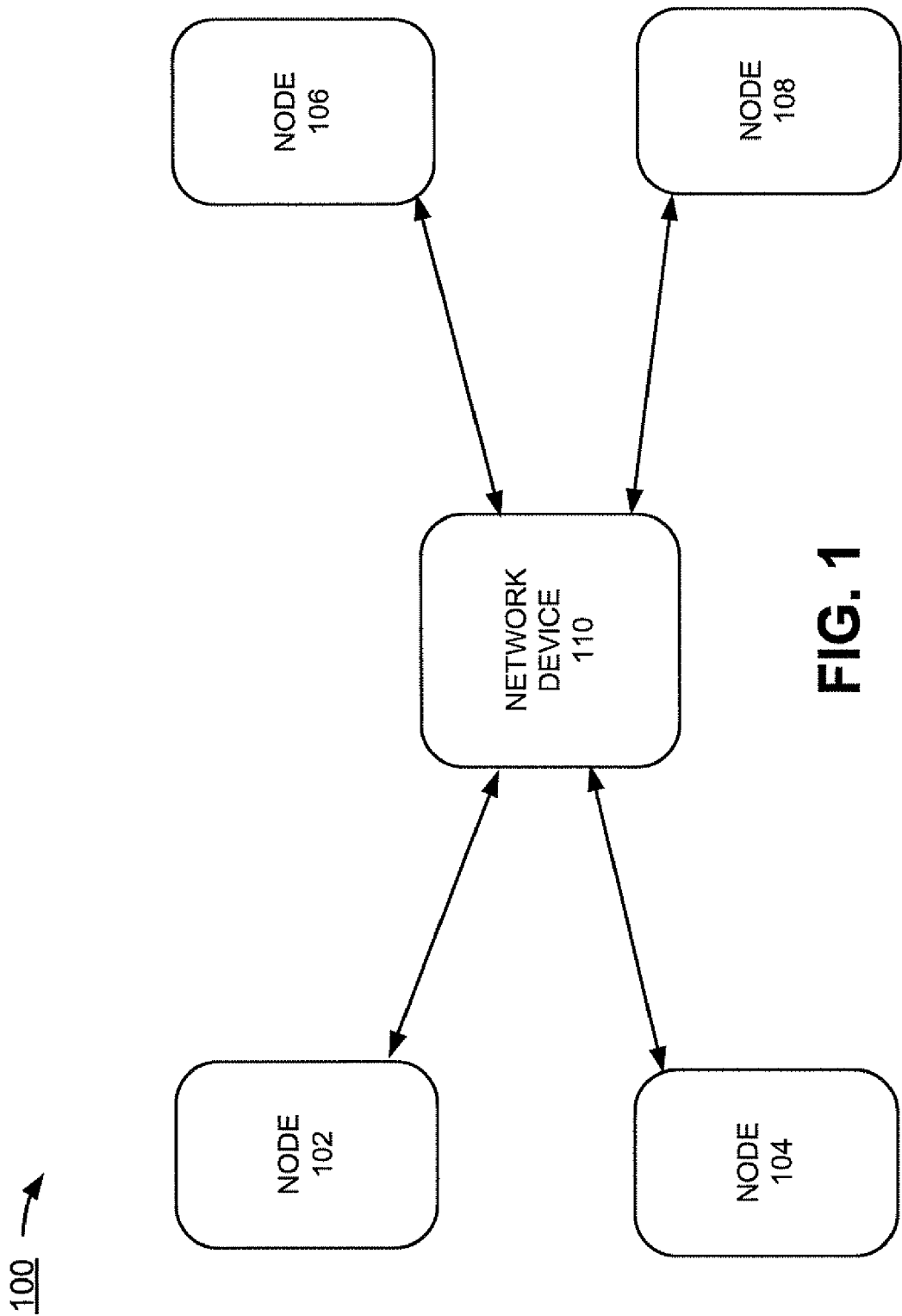
FIG. 1 is a block diagram of an exemplary environment that may include a network device for receiving and forwarding packets.

FIG. 1 is a block diagram of an exemplary environment 100 that may include nodes 102, 104, 106, and 108 and a network device 110 for receiving and forwarding packets. Environment 100 may also include in addition to network device 110. In practice, there may be more, different, or fewer devices or a different arrangement of devices than what is shown in FIG. 1. For example, environment 100 may include thousands or even millions of nodes. Further, while FIG. 1 shows nodes 102-108 and network device 110 in environment 100, one or more of these devices may be remotely located, e.g., the devices may be geographically diverse. Although arrows in FIG. 1 may indicate communication directly between devices, communication may be indirect. Communication among network device 110 and nodes 102-108 may be accomplished via wired and/or wireless communication connections.

Network device 110 may receive data from one node and may forward the data to another node. For example, network device 110 may receive a packet from node 102 and may forward the packet to node 104. Network device 110 may be a router, a switch, a packet forwarding engine, a firewall, or any other network device capable of receiving and forwarding packets.

Nodes 102-108 may include computers, telephones, personal digital assistants, or any other communication devices that may transmit or receive data. Nodes 102-108 may include, for example, computers that exchange data through network device 110. Nodes 102-108 may also include, for example, telephones that exchange voice conversations through network device 110. Network device 110 may also be considered a "node."

Nodes

Figure 2:
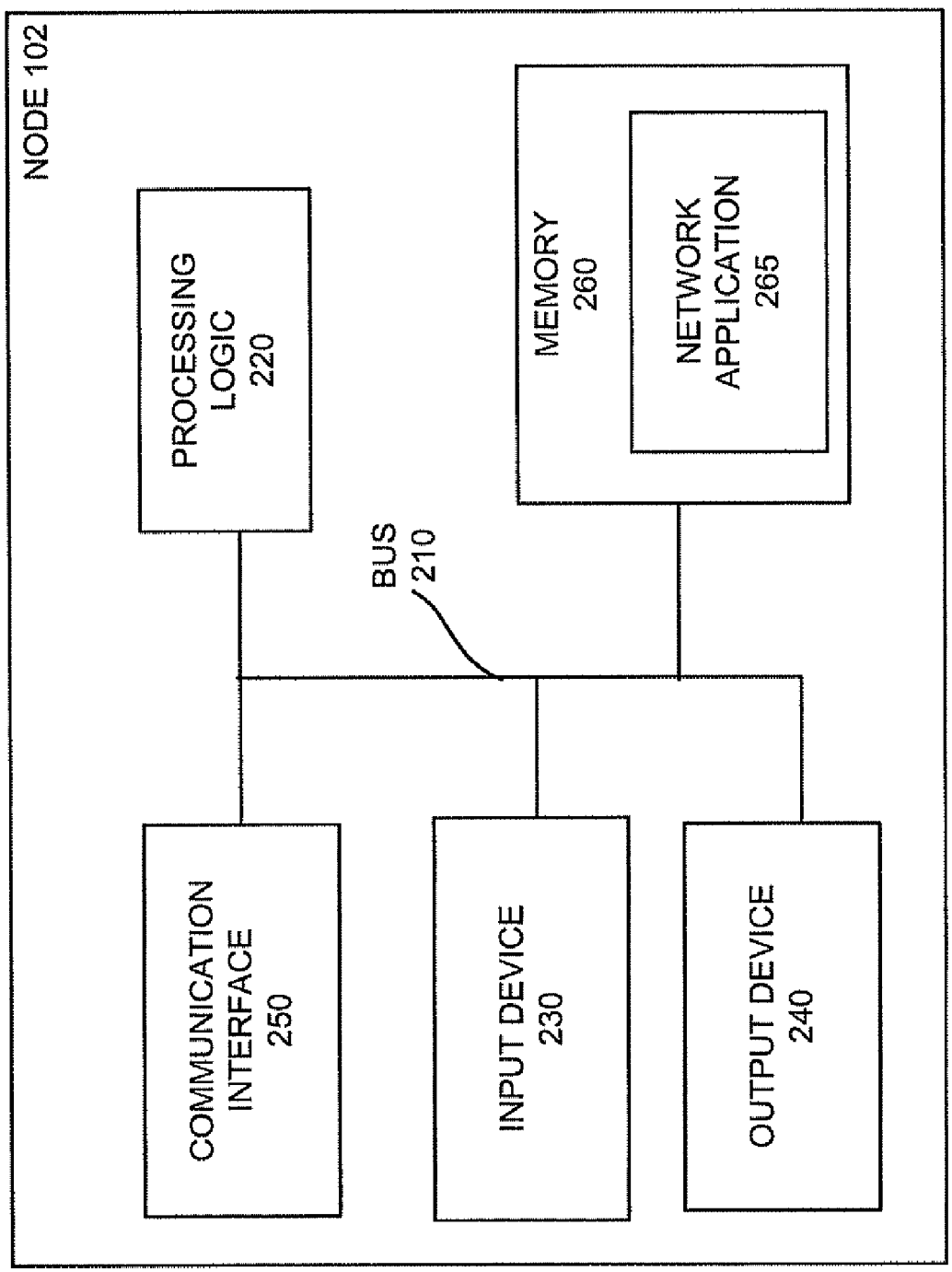
FIG. 2 is a block diagram of exemplary components of a node.

FIG. 2 is a block diagram of exemplary components of node 102. Nodes 104, 106, and 108 may be similarly configured. Node 102 may include a bus 210, processing logic 220, an input device 230, an output device 240, a communication interface 250, and a memory 260. Node 102 may include other or different components (not shown) that aid in receiving, transmitting, and/or processing data. Moreover, other configurations of components in node 102 are possible. Although components of node 102 are shown together, one or more components of node 102 may be remotely located.

Bus 210 may permit communication among the components of node 102. Processing logic 220 may include any type of processor or microprocessor that interprets and executes instructions. In other embodiments, processing logic 220 may include an application specific integrated circuit (ASIC), field programmable gate array (FPGA), or the like.

Input device 230 may include a device that permits a user to input information into node 102, such as a keyboard, a keypad, a mouse, a pen, a microphone, etc. Output device 240 may include a device that outputs information to the user, such as a display, a printer, or a speaker, etc.

Communication interface 250 may include any transceiver-like mechanism that enables node 102 to communicate with other devices and/or systems. For example, communication interface 250 may include mechanisms for communicating with node 104 via network device 110 and/or one or more networks.

Memory 260 may include a random access memory (RAM) or another type of dynamic storage device that stores information and instructions for execution by processing logic 220, a read only memory (ROM) or another type of static storage device that stores static information and instructions for processing logic 220, and/or some other type of magnetic or optical recording medium and its corresponding drive for storing information and/or instructions. Memory 260 may include a network application 265, for example, for communicating over a network.

Node 102 may establish communications, e.g., a session, with another node, such as node 104. A session may include a lasting connection between two nodes. Sessions may include telephone calls, multimedia distribution, or multimedia conferences. A session may include flows of packets between nodes. For example, a session between node 102 and node 104 may include a flow of packets from node 102 to node 104 and a flow of packets from node 104 to node 102. Node 102 may establish communication sessions and perform other acts in response to processing logic 220 executing software instructions contained in a computer-readable medium. A computer-readable medium may be defined as one or more tangible memory devices. The software instructions may be read into memory 260 from another computer-readable medium or from another device via communication interface 250.

Network Device

Figure 3:
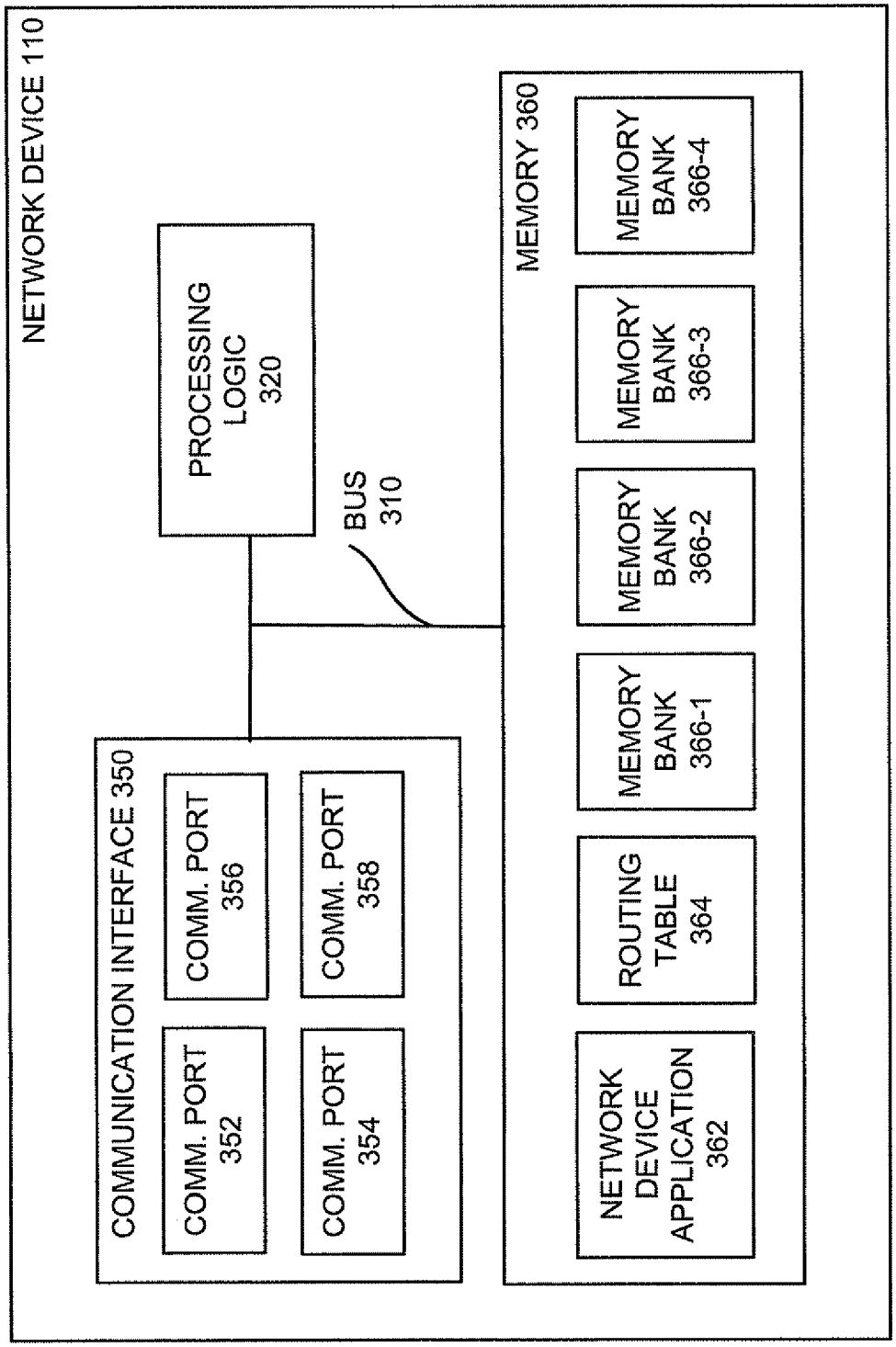
FIG. 3 is a block diagram of exemplary components of a network device.

FIG. 3 is a block diagram of exemplary components of network device 110. Network device 110 may include a bus 310, processing logic 320, a communication interface 350, and a memory 360. Network device 110 may include other or different components (not shown) that aid in receiving, transmitting, and/or processing data. Moreover, other configurations of components in network device 110 are possible. Although components of network device 110 are shown together, one or more components of network device may be remotely located.

Bus 310 may permit communication among the components of network device 110. Processing logic 320 may include any type of processor or microprocessor that interprets and executes instructions. In other embodiments, processing logic 320 may include an ASIC, FPGA, or the like.

Communication interface 350 may include communication ports 352, 354, 356, and 358. Communication ports 352-358 ("ports 352-358") may include any transceiver-like mechanism that enables network device 110 to communicate with other devices and/or systems. For example, communication port 352 may include mechanisms for communicating with node 102 via one or more networks.

Memory 360 may include a RAM or another type of dynamic storage device that stores information and instructions for execution by processing logic 320, a ROM or another type of static storage device that stores static information and instructions for processing logic 320, and/or some other type of magnetic or optical recording medium and its corresponding drive for storing information and/or instructions. Memory 360 may include a network device application 362, a routing table 364, and memory banks 366-1 through 366-4 (collectively "memory banks 366").

Network device application 362 may include instructions to assist network device 110 in forwarding packets. Routing table 364 and memory banks 366-1 through 366-4 may store information that allows network device application 362 to determine which port network device 110 may use to forward a packet. Network device application 362 may include instructions to maintain information stored in routing table 364 and memory banks 366-1 through 366-4. Network device application 362 may also include instructions to access routing table 364 and memory banks 366-1 through 366-4 when forwarding packets. Software instructions contained in a computer-readable medium, such as network application 362, may be executed by processing logic 320 to cause network device 110 to perform these and other acts. The software instructions may be read into memory 360 from another computer-readable medium or from another device via communication interface 350. In some embodiments, network device application 362 or portions of the functionality of network device application 362, may be implemented in hardware instead of software. For example, an ASIC, FPGA, or the like may be used to implement network device application 362.

In one embodiment, memory banks 366-1 through 366-4 may include separate groups of memory locations. In one embodiment, memory banks 366-1 through 366-may allow for simultaneous requests for information stored in two of the memory banks without interference with each other, e.g., the simultaneous memory requests may be non-contentious and may not need to be queued.

FIG. 4 is an exemplary routing table 364. Routing table 364 may include a destination address field 402, a next-hop information memory address field 404, and a memory bank selector algorithm field 406. Routing table 364 may include additional, different, or fewer fields than illustrated in FIG. 4. For example, routing table 364 may include a field (not shown) for a source address.

Destination address field 402 may identify destination network addresses of packets that may be received by network device 110. In exemplary routing table 364, network device 110 may receive packets that may be destined for network address 2.3.4.102, 2.3.4.104, 2.3.4.106, and 2.3.4.108, which may correspond to nodes 102, 104, 106, and 108, respectively. Next-hop information memory address field 404 may include a memory address, or part of a memory address as described below, that may store information related to the port that may be used to forward a packet to the destination address in corresponding destination address field 402.

The memory address stored in next-hop memory address field 404 may identify a memory location in memory bank 366-1, 366-2, 366-3, and/or 366-4. Memory bank selection algorithm field 406 may include an algorithm that may be used to select the memory bank that may be accessed to retrieve information related to the port that may be used to forward a packet to the destination address in corresponding destination address field 402. Alternatively, memory bank selection algorithm field 406 may include a pointer to the algorithm instead of the algorithm itself.

As mentioned, next-hop memory address field 404 may identify a memory location in memory banks 366. For example, routing table 364, memory address 1234 may store information regarding the port that may be used to send a packet to destination address 2.3.4.102, e.g., node 102. Likewise, memory address 1235 may store information regarding the port that may be used to send a packet to destination address 2.3.4.104; memory address 1236 may include information regarding the port that may be used to send a packet to destination address 2.3.4.106, e.g., node 106; memory address 1237 may include information regarding the port that may be used to send a packet to destination address 2.3.4.108, e.g., node 108. In addition, in exemplary routing table 364, the algorithm F(N) may be used to determine which memory bank may be accessed to retrieve the next-hop information. For example, algorithm F(N) may indicate that memory bank 366-1 may be accessed. Alternatively, algorithm F(N) may indicate that memory bank 366-2, 366-3, or 366-4 may be accessed.

FIG. 5 depicts exemplary next-hop information tables 500-1 through 500-4 stored in memory banks 366-1 through 366-4, respectively. Next-hop information table 500-1 may include a memory address field 502-1 and a next-hop information field 504-1. Next-hop information field 504-1 may indicate the port on which to forward a packet. Memory address field 502-1 may include the memory address used to index table 500-1 to locate the appropriate next-hop information field 504-1. In one embodiment, memory address field 502-1 may not exist as a field, but may be the address location storing the information for the corresponding next-hop information field 504-1. Next-hop information table 500-1 may include additional, different, or fewer fields than indicated in FIG. 5.

Next-hop information tables 500-2 through 500-4 may be configured similarly to next-hop information table 500-1. In one embodiment, next-hop information tables 500-1 through 500-4 may include the same data. In one embodiment, the memory addresses in information tables 500-1 through 500-4 may be the same but for an indication of the memory bank. For example, the memory addresses in information tables 500-1 through 500-4 may be the same but for the ".1," ".2," ".3," and ".4" indicating information tables 500-1, 500-2, 500-3, and 500-4, respectively.

In the exemplary embodiment of FIG. 5, memory addresses 1234.1 (in memory bank 366-1), 1234.2 (in memory bank 366-2), 1234.3 (in memory bank 366-3), and 1234.4 (in memory bank 366-4) each provide next-hop information of "port 352." Memory addresses 1235.1, 1234.2, 1234.3, and 1234.4 each provide next-hop information of "port 354." Memory addresses 1235.1, 1235.2, 1235.3, and 1235.4 each provide next-hop information of "port 356." Memory addresses 1236.1, 1236.2, 1236.3, and 1236.4 each provide next-hop information of "port 358." As shown in the exemplary embodiment, the information in next-hop information fields 504-1 thorough 504-4 is the same. In this embodiment, therefore, network device 110 may access any one of memory banks 366-1 through 366-4 for next-hop information. In other words, in one embodiment, memory banks 366-1 through 366-4 may help avoid "hot" memory addresses that are being accessed simultaneously (when multiple packets are being forwarded to the same destination node, for example), resulting in a queue, because network device 110 may access any one of memory banks 366-1 through 366-4 for next-hop information.

Algorithm F(N) stored in memory bank algorithm field 406 may determine which memory bank network device 110 ultimately uses to retrieve the next-hop information. In one embodiment, algorithm F(N) may provide the same output for a given input. Therefore, algorithm F(N) may provide the same output for each packet having the same packet flow signature. As a result, network device 110 may access the same memory bank for every packet in a packet flow. On the other hand, algorithm F(N) may provide a different result for different flows of packets. Thus, memory requests may be distributed across memory banks 366-1 through 366-4 while network device 110 handles multiple packet flows to the same destination node. In one embodiment, for different packet flow signatures, algorithm F(N) may randomly select a memory bank. In another embodiment, algorithm F(N) may randomly select a memory not based on and/or without considering the flow signature.

In the exemplary embodiment of FIGS. 4 and 5, network device 110 may forward a packet to node 102 via port 352, network device 110 may forward a packet to node 104 via port 354, network device 110 may forward a packet to node 106 via port 356, and network device 110 may forward a packet to node 108 via port 358.

Exemplary Processing

Figure 6:
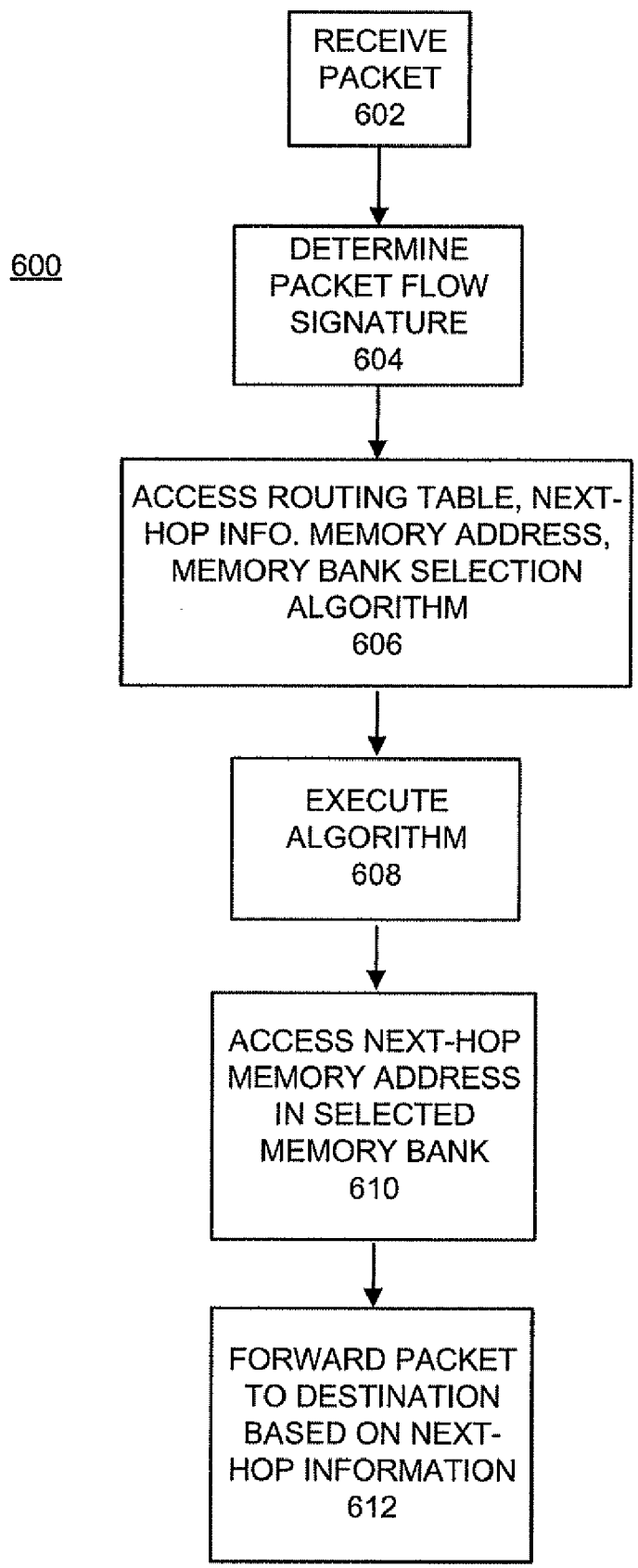
FIG. 6 is a flow chart of a process for forwarding a packet to a destination address.

FIG. 6 is a flow chart of a process 600 for forwarding a packet to a destination address. Process 600 may begin when a packet is received (block 602). A packet may be received in network device 110, for example. A packet flow signature may be determined (block 604). As used herein, a "packet flow signature" may also be referred to as "a value indicative of a flow of the packet." For example, the flow of packets between nodes 102 and 104 may have a different packet flow signature than the flow of packets between nodes 102 and 106. In one embodiment, the packet flow signature may be based on the destination address of the received packet. In another embodiment, the packet flow signature may be based on (1) the destination address of the received packet and (2) the source address of the received packet. In another embodiment, the packet flow signature may be based on (1) the source and destination address of the received packet, (2) the communication port that received the packet, (3) layer-four protocol information about the received packet, such as the PCP source port, and/or (4) other protocol information, such as the source and/or destination port number and protocol type. In one embodiment, the packet flow signature may be obtained from the header of the packet. In one embodiment, the packet flow signature may be a hash value of the information on which it is based. In one embodiment, the packet flow signature may depend on an identification of a session between two nodes.

A routing table may be accessed (block 606) for (1) next-hop memory address information and (2) a memory bank selection algorithm. The memory bank selection algorithm may be executed to select a memory bank (block 608). The selection algorithm may be a function of the packet flow signature of the received packet. Determining a packet flow signature (block 604) and executing algorithm (block 608) may be considered one embodiment of associating, e.g., mapping, a flow of packets with one of a plurality of memory banks. Next-hop information may be accessed at the next-hop memory address in the selected memory bank (block 610). The packet may be forwarded to the destination based on the next-hop information accessed at the next-hop memory address (block 612).

Figure 7:
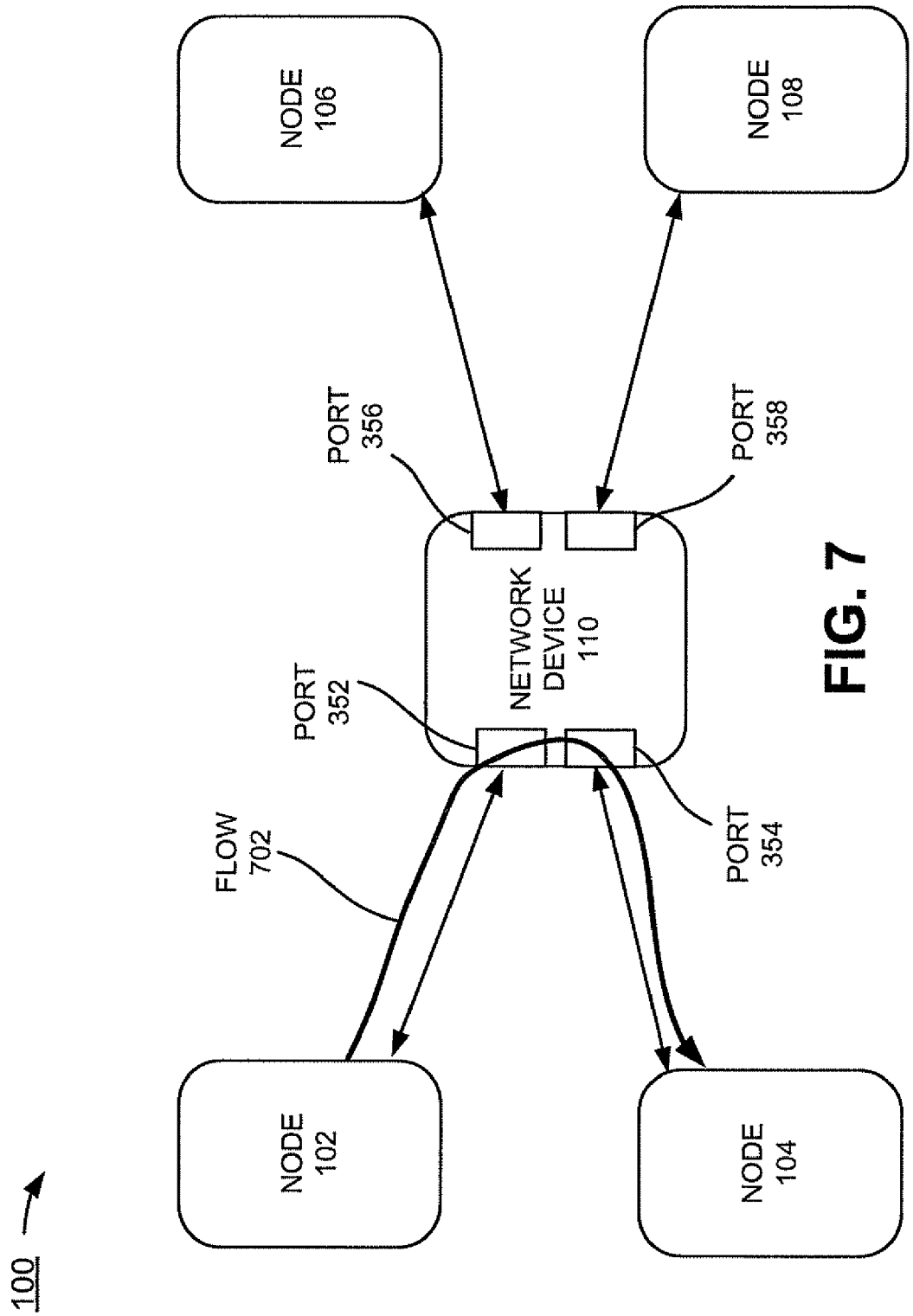
FIG. 7 is a block diagram of an exemplary flow of packets between two nodes in the environment of FIG. 1.

For example, nodes 102 and 104 may have established a session, such as a telephone call, between each other. Such a session may include a flow of packets form node 102 to node 104 and a flow of packets from node 104 to node 102. FIG. 7 is a block diagram of an exemplary flow of packets from node 102 to node 104 in environment 100. Consistent with routing table 364 and next-hop information tables 500-1 through 500-4, node 102 may be coupled to network device 110 through port 352; node 104 may be coupled to network device 110 through port 354; node 106 may be coupled to network device 110 through port 356; and node 108 may be coupled to network device 110 through port 358. The session between nodes 102 and 104 may include a flow of packets between node 102 and node 104 depicted by line 702.

In this example, network device 110 may receive a packet with the following characteristics: a destination address of 2.3.4.104 (node 104), a source address of 2.3.4.102 (node 102), and a destination port number of 599. Network device 110 may extract these characteristics of the received packet and may determine a packet flow signature of the received packet. The packet flow signature may be, for example, a concatenation of the source address, destination address, and destination port number, e.g., 234102234104599.

Network device 110 may access routing table 364 and may determine that next-hop information (for node 104 with destination address 2.3.4.104) may be stored at a memory address 1235 in a memory bank defined by a function F(N). Network device 110 may execute the function F(N), where N is the packet flow signature, e.g., 234102234104599. F(N)

may return a value of 1, 2, 3, or 4, for example. In this example, F(N) may be determined to be 3. Network device 110 may then access next-hop information table 500-3 in memory bank 366-3 at the memory address based on 1234, e.g., memory address 1235.3. Network device 110 may obtain the port number (port 354) for forwarding the received packet. Network device 110 may then forward the packet to its destination based on the next-hop information retrieved from memory 360. In this example, a different flow of packets also destined to node 104 may select a different memory address, such as memory address 1235.2, to obtain the port number (port 354) for forwarding a received packet. Because a different memory address may be used to obtain the port number, a queue for information at a memory address may be avoided and a "hot" memory address may be avoided.

CONCLUSION

Implementations described herein may allow a network device to access a plurality of memory banks for next-hop information. Implementations described herein may allow a network device to access the same memory bank for next-hop information for the same flow of packets.

The descriptions of exemplary components above, including components shown in FIGS. 2 and 3 include a discussion of software instructions contained in computer-readable media. Alternatively, in each of these implementations, hard-wired circuitry may be used in place of or in combination with software instructions to implement processes described herein. Thus, implementations described herein are not limited to any specific combination of hardware circuitry and software.

It will also be apparent that aspects, as described above, may be implemented in many different forms of software, firmware, and hardware in the implementations illustrated in the figures. The actual software code or specialized control hardware used to implement these aspects is not limiting of the present invention. Thus, the operation and behavior of the aspects were described without reference to the specific software code—it being understood that software or control hardware could be designed to implement the aspects based on the description herein.

Further, although the processes described above, including process 600, may indicate a certain order of blocks, the blocks in these figures may be performed in any order.

In addition, implementations described herein may use the internet-protocol (IP), asynchronous transfer mode (ATM) protocol, or any other type of network protocol. As such, implementations described herein may use IP addresses, ATM addresses, or any other type of network addresses. Implementations may be described in terms of packets, implementations could use any form of data (packet or non-packet).

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving a packet associated with a flow of packets, the packet including a destination address;
   determining an algorithm associated with the destination address;
   selecting one of a plurality of memory banks based on a value indicative of the flow of the packet and a result of an execution of the algorithm, where each of the plurality of memory banks stores the same next-hop information for forwarding the packet to the destination address;
   accessing, in the selected memory bank, the next-hop information for forwarding the packet to the destination address;
   forwarding the packet to the destination address based on the next-hop information; and
   selecting the same memory bank for another packet associated with the same value indicative of the flow of the packet.

2. The method of claim 1, where selecting one of the plurality of memory banks further comprises determining the value indicative of the flow of the packet.

3. The method of claim 1, further comprising determining the destination address and a source address, where the value indicative of the flow of the packet is based on the destination address and the source address.

4. The method of claim 1, further comprising randomly selecting one of the plurality of memory banks for at least one packet associated with the data flow.

5. The method of claim 1, further comprising basing the value indicative of the flow of packets on a source address of the packet and the destination address of the packet.

6. The method of claim 5, further comprising basing the value indicative of the flow of packets on an input port of the packet and a destination port of the packet.

7. A network device comprising:
   a memory to store a router table;
   a receiving port to receive a packet including a destination address;
   a plurality of memory banks, where each of the plurality of memory banks includes the same information about a forwarding port for forwarding the packet to the destination address;
   processing logic to:
      determine an algorithm associated with the destination address,
      select one of the plurality of memory banks of the memory based on a value indicative of a flow of the packet and a result of an execution of the algorithm, where the processing logic is to select the same memory bank for the same value indicative of the flow of the packet, and
      access, in the selected memory bank, the information about the forwarding port.

8. The network device of claim 7, where the processing logic is further to determine the value indicative of the flow of the packet based on the destination address.

9. The network device of claim 8, where the processing logic is further to determine the value indicative of the flow of the packet based on a source address.

10. The network device of claim 7, where the processing logic is further to select one of the plurality of memory banks randomly for another packet.

11. The network device of claim 7, where the processing logic is further to determine the value indicative of the flow of the packets based on a source address and the destination address.

12. The network device of claim 11, where the processing logic is further to determine the value indicative of the flow of the packets based on an input port of the packet or a destination port of the packet.

13. An apparatus comprising:
- means for receiving a packet associated with a flow of packets, the packet including a destination address;
- means for determining an algorithm associated with the destination address;
- means for selecting one of a plurality of memory banks based on a value indicative of the flow of the packet and a result of an execution of the algorithm, where each of the plurality of memory banks stores the same port information for forwarding the packet to the destination address;
- means for accessing, in the selected memory bank, the port information for forwarding the packet to the destination address;
- means for forwarding the packet to the destination address based on the port information; and
- means for selecting the same memory bank for another packet associated with the flow of packets.

14. The apparatus of claim 13, further comprising means for determining the destination address and a source address, where the value indicative of the flow of the packet includes the destination address and the source address.

15. The apparatus of claim 14, where the means for selecting one of the plurality of memory banks comprises means for determining the value indicative of the flow of the packet.

16. The apparatus of claim 13, further comprising means for accessing a router table and determining a memory address associated with the destination address and an algorithm associated with the destination address.

17. A method comprising:
- receiving a first packet associated with a flow of packets, the first packet including a destination address;
- determining an algorithm associated with the destination address;
- accessing in a memory bank, next-hop information for forwarding the first packet to the destination address, where the memory bank is associated with a value indicative of the flow of packets and a result of an execution of the algorithm;
- forwarding the first packet to the destination address based on the next-hop information;
- receiving a second packet associated with the flow of packets, the second packet including the destination address;
- accessing, in the same memory bank, next-hop information for forwarding the second packet to the destination address,
    - where the first and second memory banks each store the same next-hop information for forwarding the packet to the destination address, and
    - forwarding the second packet to the destination address based on the next-hop information.

* * * * *

UNITED STATES PATENT AND TRADEMARK OFFICE
CERTIFICATE OF CORRECTION

PATENT NO.        : 7,680,117 B1
APPLICATION NO.   : 11/694,738
DATED             : March 16, 2010
INVENTOR(S)       : Nitin Kumar et al.

Page 1 of 1

It is certified that error appears in the above-identified patent and that said Letters Patent is hereby corrected as shown below:

Column 10, Line 23, after "address", please delete "," and insert --;--.

Column 10, Line 24, the indent should be formatted so that the word "forwarding" should line up with the word "accessing" in Column 10, Line 18.

Signed and Sealed this

Eleventh Day of May, 2010

David J. Kappos
*Director of the United States Patent and Trademark Office*